R H Heat

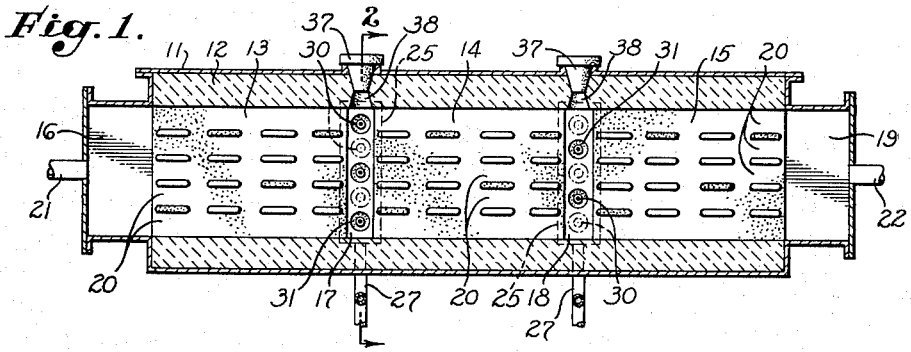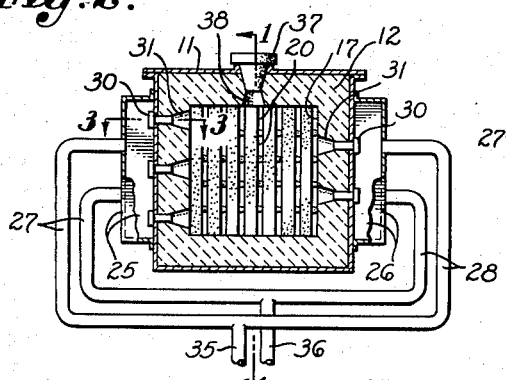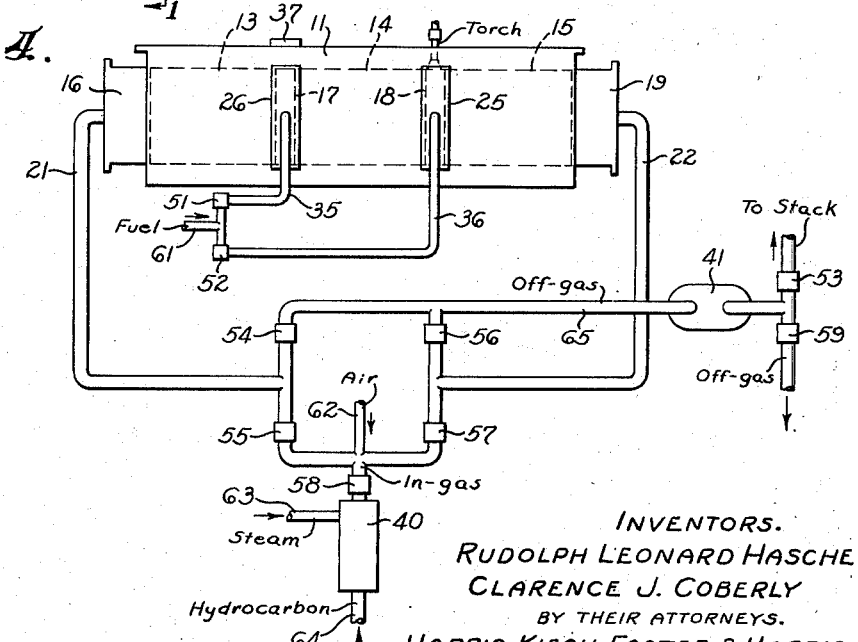

L H Make

INVENTORS.
RUDOLPH LEONARD HASCHE
CLARENCE J. COBERLY
BY THEIR ATTORNEYS.
HARRIS, KIECH, FOSTER & HARRIS

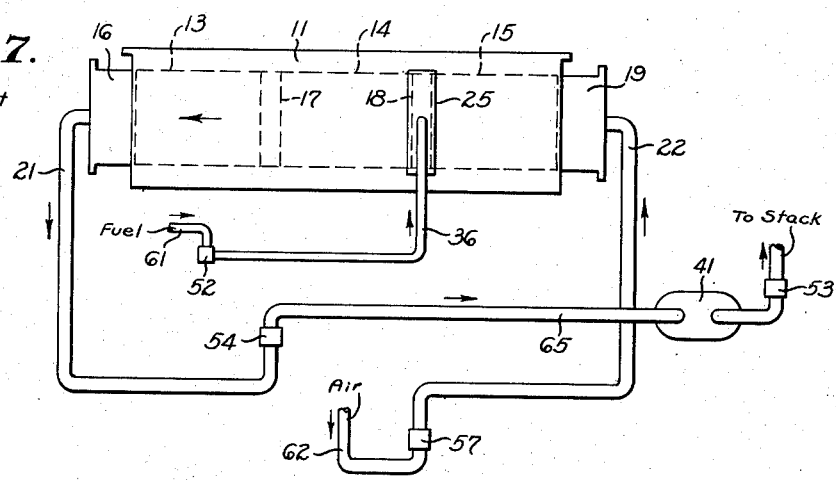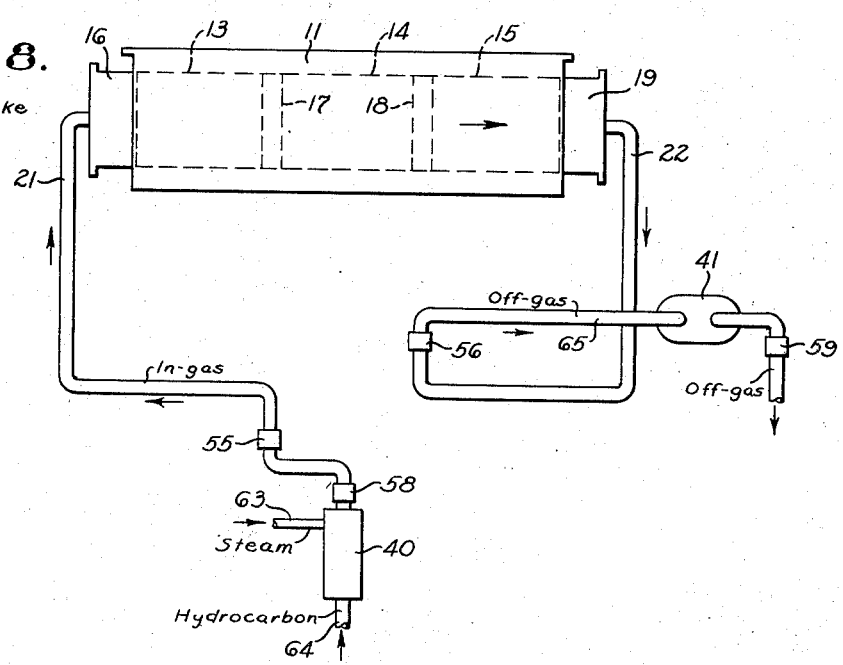

Patented Oct. 26, 1954

2,692,819

UNITED STATES PATENT OFFICE 2,692,819

FURNACE AND APPARATUS FOR PRODUCING ACETYLENE BY THE PYROLYSIS OF A SUITABLE HYDROCARBON

Rudolph Leonard Hasche, Johnson City, Tenn., and Clarence J. Coberly, Los Angeles, Calif.; said Coberly assignor to Wulff Process Company, Huntington Park, Calif., a corporation of California Application March 10, 1952, Serial No. 275,822

2 Claims. (Cl. 23—277)

It is an object of the invention to provide a new and useful process for producing an off-gas containing a substantial proportion of acetylene from an in-gas consisting of, or containing a substantial proportion of, a suitable hydrocarbon.

It is a further object of the invention to provide a new and useful furnace which may be used in such a process or for other purposes.

It is a further object of the invention to provide a new and useful apparatus which includes such a furnace, such apparatus being capable of use in practicing said process and for other purposes.

In this process an in-gas containing a substantial proportion of a suitable hydrocarbon is heated in a suitable apparatus in such a manner that a portion of the hydrocarbon reacts to form an off-gas containing a substantial proportion of acetylene. In all interpretations of the accompanying specification and claims, the following definitions should govern:

"In-gas" is the gas that is delivered to the furnace forming a part of the apparatus.

"Off-gas" is a gas formed in and delivered from said furnace.

A "substantial proportion" of any gas carried in a mixture is a proportion by volume of at least two per cent (2%) of that gas to one hundred per cent (100%) of the total volume of all gases in the mixture.

A "suitable hydrocarbon" is any hydrocarbon known to the art, at the time this application was filled, to be capable of forming acetylene when properly pyrolyzed. Methane, ethane, propane, and butane, or unsaturated hydrocarbons such as ethylene, butylene, and propylene, and gases such as natural gas are among the many hydrocarbons which fall within this definition.

"Pyrolysis" is a reaction induced by heat by which a portion of a suitable hydrocarbon reacts to form acetylene.

"Sensible heat" is heat absorbed by a gas as it is heated, which is not absorbed by any reaction and which can be recovered from that gas as it cools.

"Reaction heat" is heat absorbed by or liberated from a gas as a result of a reaction. If heat is absorbed, the reaction is "endothermic," and if heat is liberated, the reaction is "exothermic." When a suitable hydrocarbon reacts to form acetylene the reaction is highly endothermic, about 3,900 B. t. u. being absorbed by the reaction for each pound of acetylene so produced.

"Carbon conversion efficiency" is the percentage of the total carbon contained in the suitable hydrocarbon of the in-gas which is found in the acetylene in the off-gas.

The process disclosed and claimed herein is a regenerative one in that heat is delivered to the in-gas from a regenerative mass as the in-gas passes through channels in said mass, this heat having been previously delivered to said mass from an off-gas which has passed through said channels. The process is a "heat and make" process in that a regenerative mass is heated during the "heat" step by hot products of combustion which are passed through channels in said mass, the heat so delivered to said mass being delivered to an off-gas during a "make" period during which the suitable hydrocarbon is partially converted to acetylene.

It is an object of the invention to provide a high degree of heat economy by providing a plurality of regenerative masses, one of which is absorbing sensible heat from the off-gas while the other is supplying sensible heat to the in-gas during the "make" period.

It is an object of the invention to provide for a high combustion temperature during the heat period by supplying sufficient heat to the air needed for combustion to raise said air to a temperature substantially above the ignition temperature of the fuel consumed in said combustion before said fuel is mixed with the air, the sensible heat needed to so heat the air being absorbed by the air from one of the regenerative masses prior to being used for combustion.

It is a further object of the invention to provide a four-step cycle, each cycle consisting of two "heat" steps and two "make" steps, the heat steps of each cycle being so conducted that each of the regenerative masses is used in one step to heat the air, this heating being, in part, produced by the combustion of tar or carbon previously deposited in the channels of the mass.

Further objects and advantages will be made evident hereinafter.

In the drawings which illustrate one suitable form of apparatus:

Fig. 1 is a vertical cross section of a furnace suitable for use in our process, this section being taken on a plane indicated by the line 1—1 in Fig. 2;

Fig. 2 is a section through said furnace, this section being taken on a plane indicated by the line 2—2 of Fig. 1;

Fig. 3 is a section on a larger scale than Fig. 1 and Fig. 2, through a header and one of the fuel injection nozzles used in said furnace, this section being taken on a plane indicated by the line 3—3 of Fig. 2;

Fig. 4 is a diagram showing the furnace illustrated in Figs. 1, 2, and 3, together with the pipes, valves, and auxiliary apparatus which are provided when the furnace is to be used in the process claimed herein; and Figs. 5, 6, 7, and 8 are diagrams, each showing the pipes, valves, and auxiliary apparatus used in one of the four steps of the process. In each diagram only those pipes, valves, and the auxiliary apparatus that is used in the step illustrated are shown, all parts not shown in any diagram being unused.

Figure 5:
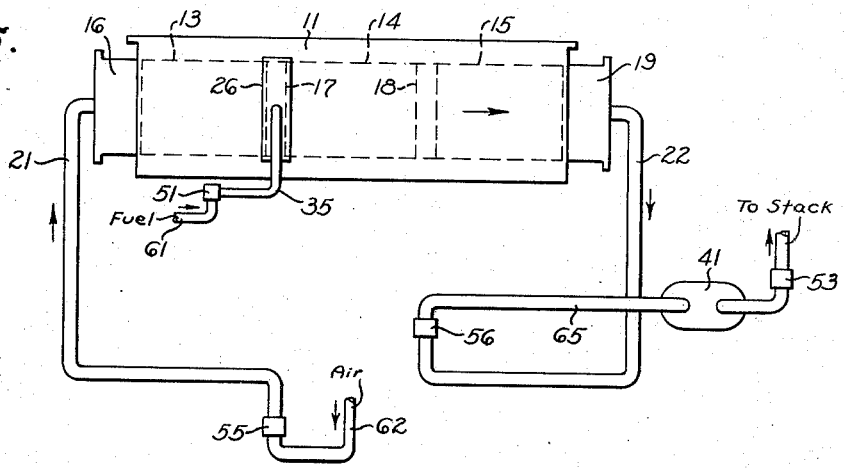
Figure 6:
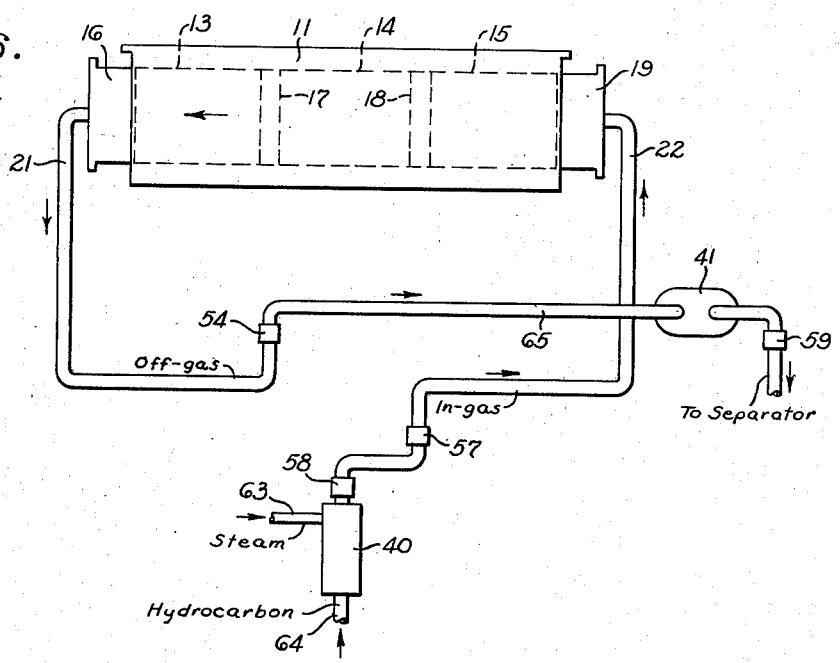

Fig. 5 illustrates the right-hand heat step, Fig. 6 illustrates the left-hand make step, Fig. 7 illustrates the left-hand heat step, and Fig. 8 illustrates the right-hand make step.

The valves shown are preferably power operated in regular sequence by control apparatus, not shown. Flowmeters, thermostats, and other convenient, but not absolutely necessary, auxiliaries are also not shown.

Words denoting position like "up" or "down" refer only to positions as shown in the drawings and do not indicate any position with relation to the center of the earth.

In the following specification and claims, the abbreviations "RH" for right-hand and "LH" for left-hand are freely used to denote the position of parts as seen in the drawings.

The furnace illustrated in Figs. 1, 2, and 3 consists of a steel shell 11 inside the main portion of which is a heat refractory and heat insulating lining 12. Three heat refractory, heat regenerating masses 13, 14, and 15 are located inside the lining 12 and divide it into an LH end space 16, an LH combustion chamber 17, an RH combustion chamber 18, and an RH end space 19. The masses 13, 14, and 15 are preferably built up of alumina, silicon carbide bricks or tile, or other refractory as shown in United States Letters Patent No. 2,473,427, so that there are channels or slots, indicated at 20 in Fig. 2, which run through each of the masses 13, 14, and 15 so that gas introduced into one of the end spaces 16 or 19 can flow horizontally through the masses 13, 14, and 15 to the other end space.

An LH furnace pipe 21 delivers gas to or takes it from the LH end space 16 and an RH furnace pipe 22 delivers gas to or takes it from the RH end space 19. On the LH side of the furnace, as seen in Fig. 2, are two gas-tight headers or manifolds 25 and on the RH side of said furnace are two RH headers or manifolds 26. A fuel gas may be fed to each manifold 25 through pipes 27 and to each manifold 26 through pipes 28. Nozzles 30 are welded or otherwise secured in gas-tight relationship to the shell 11 and project into cavities 31 which are provided in the lining 12. These nozzles deliver a fuel gas under pressure and at high velocity through a central opening 32 in each nozzle. Preferably three or more nozzles 30 deliver fuel gas from the manifolds 25 into the LH side, as seen in Fig. 2, of each of the combustion spaces 17 and 18, two or more nozzles on the opposite side of, but staggered with relation to, the nozzles on the other side, delivering fuel gas to the other side of the spaces. The object of having these nozzles staggered is to produce very thorough mixing of the fuel gas with hot air delivered through the channels 20 to each combustion space 17 and 18. The pipes 27 and 28 feeding gas to the LH combustion space 17 are joined and in turn fed through a single pipe 35, similar pipes feeding fuel gas through a manifold and its nozzles 30 into the combustion space 18 being joined to and fed with fuel gas through a pipe 36.

Covers 37 which make gas-tight closures with holes 38 opening into the combustion spaces 17 and 18 are provided to allow the furnace to be preheated by a torch before being put into cyclic operation, as will hereinafter be explained.

The furnace, when used to conduct the process claimed herein, forms a part of the apparatus shown in Fig. 4 which will now be described. This apparatus which includes not only the furnace, but also other necessary pipes, valves, and auxiliary apparatus, is shown in Fig. 4 and includes a mixer 40, a vacuum pump 41, valves 53 to 59, inclusive, and the necessary piping to connect all this apparatus as hereinafer set forth. Fuel oil is delivered to the apparatus through a pipe 61, air is delivered through a pipe 62, steam through a pipe 63 and a suitable hydrocarbon through a pipe 64. The off-gas produced in the process is delivered from the apparatus through a pipe 65.

The operation of the apparatus shown in Fig. 4 to carry on the process hereinafter claimed is as follows: If the furnace is cold, which may occur whenever it is shut down for a considerable period, it must be preheated before cyclic action is started.

In preheating, the valve 53 leading to the stack is open, and the valves 54 and 56 are open, all other valves being closed. Covers 37 are removed from the openings 38 and the pump 41 is started. Torches are then inserted into the firing spaces 17 and 18 and hot gas, made by combustion at the torches, is drawn through channels in the masses 13 and 15 heating them until the masses 13 and 15 are at a temperature preferably above 2000° F. The covers 37 are then replaced and cyclic operation may start.

The first step in the recurring cycle is an RH heat step illustrated by Fig. 5. The pump 41 operates throughout the cycle sending products of combustion, which have delivered a large portion of their initial heat to the masses, off to a stack, not shown, through the valve 53 during each heat step. During the RH heat step shown in Fig. 5, the valves 51, 53, 55, and 56 are open and all other valves are closed. The pump pulls a partial vacuum on the interior of the furnace through the valve 56. Air is drawn in from the pipe 62 and through the valve 55 and the pipe 21 into the LH end space 16 of the furnace and through the channels 20 in the LH mass 13 into the LH combustion space 17. This air is heated in its progress through the channels in the mass 13 and, of course, extracts heat from that mass. Fuel gas, preferably under superatmospheric pressure, in the pipe 61 is delivered through the valve 51 and the pipe 35 to the manifolds 26. Enough fuel gas is delivered to initiate a good combustion in the LH combustion chamber 17. In the example shown in Figs. 1 and 2, it will be noted that the nozzles 30 deliver the fuel gas in five streams; two as shown in Fig. 2 from the RH side of the chamber 17, and three from the LH side, the nozzles being arranged so that the jets of fuel from one side do not meet and impinge on the jets from the other side.

It will also be noted that jets from each side cross the slots or channels 20 of the mass 13 at right angles to the plane of the slots. The hot products of combustion during the RH heat step pass through the channels in the central mass 14, through the RH combustion space 18, through the channels in the RH mass 15 into the RH end space 19. These gases heat the central mass 14, this mass at all times during the cycle being maintained at a temperature substantially above 1500° F. Some heat units are, of course, subtracted from the products of combustion as these products pass through the channels 20 in the central mass 14. Further heat units are subtracted from the products of combustion as they pass through the RH mass 15 into the RH end space 19, this mass being itself heated, its LH end being at a temperature substantially above 1500° F. although the LH end of the mass 15 need not be at quite that temperature if the mass 14 is at a higher temperature. The masses 13 and 15 should be sufficiently long from right to left to extract enough heat from the gases passed therethrough so that the outer ends of these masses are preferably never at a temperature less than 200° F. as below this temperature tars may condense in the channels in the regenerative masses. Low end temperatures in the outer ends of the masses 13 and 15 result in a high heat economy for the process.

The cooled products of combustion are drawn from the end space 19 through the pipe 22 and the valve 56 into the pump 41 and discharged through the valve 53 to a stack, not shown. The heat step above described is usually stopped before the temperature in the mass 14 is raised to 3000° F. The apparatus is then ready for the LH make step illustrated in Fig. 6 in which an in-gas containing a suitable hydrocarbon passes from right to left through the furnace.

During the LH make step the valves 54, 57, 58, and 59 are open and all other valves are closed. The in-gas is produced in the mixer 40 by mixing a suitable hydrocarbon delivered to the mixer 40 through the pipe 64 with several times its volume of steam delivered through the pipe 63. The pump 41 still pulling a vacuum on the interior of the furnace, the in-gas is drawn through the valves 57 and 58 and the pipe 22 into the RH end space 19 of the furnace and through the channels 20 in the masses 15, 14, and 13, in order, into the LH end space 16 and through the pipe 21 and the valve 54 into the pump 41 and from that pump through the valve 59 to a separator, not shown. During the LH make step, the in-gas is first heated in the channels 20 of the mass 15 to about the temperature at which the reaction of hydrocarbon to acetylene occurs. This temperature will vary with furnace conditions. Of course, the flow of relatively cold in-gas through the mass 15 cools this mass. Some pyrolysis of the hydrocarbon may occur near the inner or LH end of the mass 15 but the main pyrolysis occurs in the mass 14. The greater portion of the heat needed for the reaction is extracted from the mass 14 in which the off-gas containing a substantial proportion of acetylene is formed.

In the formation of acetylene from a suitable hydrocarbon, hydrogen is released and as much as thirty per cent (30%) or more of the volume of the off-gas may be hydrogen. It is, of course, understood that the off-gas is mixed with a considerable volume of steam which is not considered a portion of the off-gas in defining proportions thereof. It is essential, however, that the reaction of the hydrocarbons shall not be allowed to be completed. In other words, a substantial proportion of hydrocarbons other than acetylene must be left as a buffer in the off-gas. These hydrocarbons may be methane, ethane, ethylene or any other gases capable of forming acetylene by pyrolysis. The operator must at all times so control the operation of the process that there is still a substantial proportion of the buffer hydrocarbons in the off-gas delivered through the valve 59 to the separator.

It should be understood that all the valves are power operated from a controller, not shown, and that once proper adjustments are made by the operator the apparatus operates automatically without further attention over a long period.

The LH make step is followed by the LH heat step illustrated in Fig. 7 in which air from the pipe 62 flows through the valve 57 and the pipe 22 into the RH end space 19 in the furnace and passes through and is heated in the channels in the RH mass 15. Fuel gas is injected from the pipe 36 and manifold 25 into the RH combustion space 18, being delivered to the manifold 25 through the pipe 36 and the valve 52 from the fuel pipe 61. In the LH make step hot products of combustion from the combustion space 18 heat the central mass 14 and the LH mass 13, and the mass 15 is cooled by the air.

The RH make step differs from the LH make step only in that the direction of flow of gas through the furnace is reversed. The RH make step is illustrated in Fig. 8.

In-gas is formed in the mixer 40 by mixing a suitable hydrocarbon from the pipe 64 with steam from the pipe 63, the in-gas then flowing through the valves 55 and 58 to the LH end of the furnace through the pipe 21 and passing from left to right through the furnace, being taken off through the pipe 22, passing through the valve 56 to the pump 41, and through the valve 59 to the separator. The RH make step illustrated in Fig. 8 completes the cycle and is followed in the succeeding cycle by an RH heat step as illustrated in Fig. 5.

It should be noted that each heat step, Figs. 5 and 7, is followed by a make step, Figs. 6 and 8, in which the direction of flow of gas through the furnace is reversed and each make step is followed by a heat step in which the direction of said flow is not reversed. For example, LH make, Fig. 6, is followed by LH heat, Fig. 7, and RH make, Fig. 8, is followed by RH heat, Fig. 5.

Even when the furnace is operating at high efficiency, some tar and carbon tend to collect in the channels 20. To burn out the tar and carbon, the valve 51 may be closed shortly before the end of the RH heat step, Fig. 5, and the valve 52 is closed shortly before the end of the LH heat step, Fig. 7. By sending very hot air through the channels 20, any carbon and tar which has been deposited therein may be burned out. It should be noted that the direction of the air is reversed in the LH heat step, Fig. 7, from that used in the RH heat step, Fig. 5, so that once in each cycle each of the masses 13, 14, and 15 is purged of carbon and tar, the heat of combustion of which is largely absorbed by the regenerative masses.

We claim as our invention:

1. An apparatus suited for use in the pyrolysis of hydrocarbons comprising: a gas-tight shell having a major axis; a heat refractory lining inside said shell; three heat regenerative masses inside said lining and all having their central axes on the major axis of the furnace, said major axis and the axis of each of said masses being imaginary straight lines, each of said masses having channels therethrough, said channels extending parallel to said axis, there being a first combustion space between the first and second of said masses and a second combustion space between the second and third of said masses; a first set of nozzles so placed as to direct jets of fuel gas into the first combustion space; a second set of nozzles so placed as to direct jets of fuel gas into said second combustion space; pipe and valve means through which a fuel gas can be delivered to either set of said nozzles; a mixer; pipe and valve through which a suitable hydrocarbon can be supplied to said mixer; pipe and valves through which a diluent may be supplied to said mixer; pipe and valves through which gas from said mixer can be supplied to an open space in either end of said shell; a vacuum pump; and pipe and valves through which said pump may withdraw gas from either of said open spaces.

2. An apparatus suited for use in the pyrolysis of hydrocarbons comprising: a gas-tight shell having a major axis; a heat refractory lining inside said shell; three heat regenerative masses inside said lining and all having their central axes on the major axis of the furnace, said major axis and the axis of each of said masses being imaginary straight lines, each of said masses having channels therethrough, said channels extending parallel to said axis, there being a first combustion space between the first and second of said masses and a second combustion space between the second and third of said masses; a first set of nozzles so placed as to direct jets of fuel gas into the first combustion space; a second set of nozzles so placed as to direct jets of fuel gas into said second combustion space; pipe and valve means through which a fuel gas can be delivered to either set of said nozzles; a mixer; pipe and valves through which a suitable hydrocarbon can be supplied to said mixer; pipe and valves through which a diluent may be supplied to said mixer; pipe and valves through which gas from said mixer can be supplied to an open space in either end of said shell; a vacuum pump; pipe and valves through which said pump may withdraw gas from either of said open spaces; pipes and valves through which gas so drawn from said open spaces by said pump may be delivered to a stack; and pipes and valves through which gas so drawn from said open spaces by said pump may be delivered to a separating apparatus.

References Cited in the file of this patent

UNITED STATES PATENTS

| Number | Name | Date |
| --- | --- | --- |
| 1,711,273 | Manker | Apr. 30, 1929 |
| 1,900,396 | Isley | Mar. 7, 1933 |
| 1,965,770 | Burgin | July 10, 1934 |
| 2,208,123 | Duncan | July 16, 1940 |
| 2,313,157 | Linder | Mar. 9, 1943 |
| 2,349,439 | Koppers | May 23, 1944 |
| 2,351,661 | Carter | June 20, 1944 |
| 2,552,277 | Hasche | May 8, 1951 |

FOREIGN PATENTS

| Number | Country | Date |
| --- | --- | --- |
| 578,311 | Germany | June 12, 1933 |
| 583,851 | Germany | Sept. 13, 1933 |